INVENTOR.
WILLIAM J. GREENE
BY
ATTORNEY

INVENTOR.
WILLIAM J. GREENE
ATTORNEY

Aug. 14, 1962 W. J. GREENE 3,049,608
ELECTRON BEAM WELDING
Filed Aug. 24, 1959 4 Sheets-Sheet 4

INVENTOR.
WILLIAM J. GREENE
BY
ATTORNEY

United States Patent Office 3,049,608
Patented Aug. 14, 1962

3,049,608
ELECTRON BEAM WELDING
William John Greene, Scotch Plains, N.J., assignor to Air Reduction Company, Incorporated, New York, N.Y., a corporation of New York
Filed Aug. 24, 1959, Ser. No. 835,726
14 Claims. (Cl. 219—117)

This invention relates to electron beam welding, and particularly to methods and apparatus for producing high intensity, focused electron beams for electron beam welding.

It has been proposed to use electron beams of high intensity for the welding of metals which are difficult to handle by more conventional welding techniques. Among such metals are zirconium, titanium, molybdenum and their alloys.

It has also been proposed to use electron beams for making holes in extremely hard materials, e.g., diamonds. In electron beam welding and cutting methods and apparatus of the prior art, it has been proposed to use extremely high voltages, in the neighborhood of 100,000 volts. The electron beam welding and cutting methods and apparatus of the prior art have all been limited to laboratory use, as opposed to use under shop conditions or in substantial production runs.

The basic problem in the construction of electron beam welding apparatus is to get a sufficient amount of heat released at the welding spot. In order to secure that heat, a corresponding amount of power must be introduced through the electron beam. In most cases, the electron beam welding methods and apparatus of the prior art have used voltages in the neighborhood of 100,000 volts. Such voltages are inherently unsuitable for use under shop conitions, for at least two reasons. One reason is that such voltages produce hard X-rays from the target, which present a hazard to persons using the apparatus. Another reason is that such voltages are difficult to handle without shock hazards and corona discharge problems. Furthermore the higher the voltage used, the higher the vacuum required to avoid a gaseous breakdown in the electron beam apparatus.

Some attempts have been made to provide electron beam welding apparatus operating at voltages below the X-ray hazard limit, which is about 15,000 volts. At such lower voltages, the current in the electron beam must be high in order to transfer the necessary heat to the weld spot. Currents up to approximately one ampere are required. Electron beams carrying currents of that order of magnitude have inherent space charges, i.e., mutual repulsion of the electrons in the beam, which tend to spread the beam and prevent it from focusing. It has not previously been known how to focus a beam carrying a current of that magnitude so as to produce a narrow, sharply defined weld spot (e.g., a circle of about $\frac{1}{16}$ inch in diameter).

Other difficulties and problems are encountered in connection with electron beam welding which are not found in cathode ray devices generally. Among those problems are the emission of vapors and ions from the workpiece target, which vapors tend to condense on and foul the parts of the electron beam producing system. Another problem arises because the vacuum maintained within the apparatus must necessarily be broken at relatively short intervals to remove the finished workpieces and replace them by new ones. The cathode and other parts of the electron beam producing apparatus are thereby subject to repeated pressure cycles which adversely affect some types of structures, e.g., thoriated tungsten filaments which are common in conventional cathode ray tubes. Because of the high current requirements and vapor emission problems encountered, it is essential that cathode and other parts of the electron beam producing structure be demountable for easy and economical repair and replacement of parts.

One electron beam welding apparatus of the prior art is described in the article entitled, "High-Vacuum-Electron-Beam Fusion Welding" by Wyman, which appears on pages 49S to 53S of the Welding Research Supplement to the Welding Journal for February 1958. The apparatus disclosed in the Wyman article employs a beam which is focused only by a simple iris-apertured plate so that the workpiece is very close to the cathode, thereby subjecting the cathode to vapors arising from the welded material. It is noted that the only current value explicitly given in the Wyman article is 250 milliamperes. See column 1 on page 50S. While 2,000 milliamperes are mentioned in the second column, this is an estimated value only. Wyman does not claim that the equipment disclosed can carry that much current.

It is an object of the present invention to provide improved electron beam welding apparatus using direct current voltages below 15,000.

Another object of the invention is to provide an improved electron gun structure for producing an electron beam which may carry current in the neighborhood of 1 ampere and which is nevertheless sharply focused to a diameter of approximately $\frac{1}{16}$ inch.

A further object is to provide an electron gun structure adapted for use in electron beam welding apparatus. A further object is to provide an electron gun structure which is demountable for replacement and maintenance of parts.

Another object is to provide an improved housing or vacuum chamber for electron beam welding apparatus of the type described. A further object is to provide such a housing which may be readily constructed from commercially available parts.

A further object is to provide improved electric supply and control circuits for electron beam welding apparatus of the type described.

A further object is to provide an improved method of electron beam welding utilizing apparatus of the type described.

The foregoing and other objects of the invention are attained in the method and apparatus described herein. That apparatus includes an electron gun for producing a high current (e.g., 1 ampere) electron beam. As in conventional electron guns for cathode ray tubes, there is provided a control electrode which focuses the beam to a so-called cross-over point close to the cathode. From the cross-over point the beam passes through an accelerating anode wherein it is allowed to expand under the influence of its own space charge to a diameter considerably greater than is conventionally employed in cathode ray tubes. It is then refocused from this large diameter to a small diameter at the weld spot. This refocusing is preferably accomplished by an electromagnetic coil.

I have discovered that the angle of convergence between this large diameter portion of the beam and the weld spot is quite critical and should be substantially 28°. If a smaller angle of convergence is used, the space charge within the beam is not overcome by the focusing field and effectively maintains the beam in a spread condition which inhibit focusing. If a larger angle of convergence is used, the phenomena known as chromatic aberrations and spherical aberrations are encountered, which effectively inhibit focusing to a sharply defined spot.

The housing structure of the electron beam welding apparatus described herein uses as its principal part a commercially available welded steel pipe tee, including a straight main conduit and a branch conduit integral with and opening into the main conduit. The workpiece to be welded is supported in the main conduit in alignment with the opening into the branch conduit. The electron gun is mounted in the branch conduit and aligned with the workpiece. The electron gun is mounted axially of a cylindrical support which telescopes into the branch conduit so that its position may be adjusted longitudinally of the branch conduit.

The electron gun is built in a novel "lighthouse" construction, and in the illustrated embodiment, comprises an electrically conductive cylinder fixed on the inner end of the telescoping support, and two electrically insulating cylinders stacked on the conductive cylinder. All the cylinders are open at both ends. The two insulating cylinders are separated by an electrically conductive plate. Another such plate closes the open end of the cylinder farthest from the support. The two plates support the electrodes of the electron gun. The plates are insulated from each other by one of the insulating cylinders and held in alignment with each other by nylon bolts. The structure is demountable for the removal and replacement of any of the electrodes.

The accelerating anode is of novel construction, comprising an externally threaded cylinder received in an internally threaded aperture in one of the plates, so that the position of the anode may be adjusted axially of the cylindrical gun. A shield is provided inside the electron gun, to protect the insulating cylinder nearest the workpiece from the deposit of vapors which might otherwise establish an electrically conductive path across the surface of that insulating cylinder.

The current supply circuits for welding apparatus include separate supplies for the cathode, for the accelerating anode and for the magnetic focusing coil. That coil is tiltable about its axis in order to change the position of the weld spot on the workpiece. The beam may be controlled as to size and intensity by controlling the cathode current, various anode potentials, and the current in the electromagnetic coil.

Other objects and advantages of the invention will become apparent from a consideration of the following specification and claims, taken together with the accompanying drawings.

*Figs. 1–3 and 5*

Figure 1:
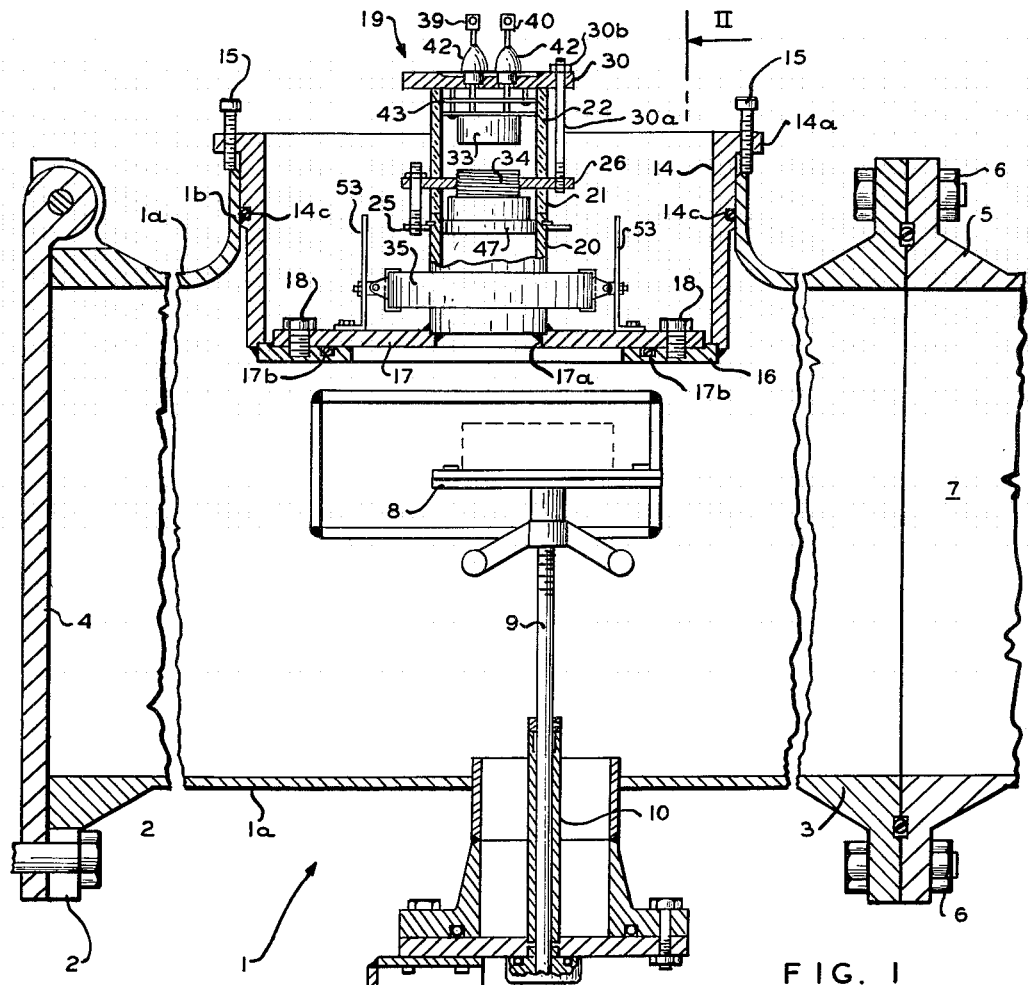
FIG. 1 is a vertical cross-sectional view through an electron beam welding apparatus constructed in accordance with the present invention, taken on the line I—I of FIG. 2.

The principal parts of the electron beam welding apparatus of FIGS. 1 to 3 and 5 are enclosed in a housing generally indicated by the reference numeral 1 and consisting of a standard stainless steel pipe tee, including a main conduit 1a, and a branch conduit 1b opening into the main conduit. The respective ends of the main conduit 1a are provided with coupling flanges 2 and 3. The coupling flange 2 is closed by a hinged door 4. The coupling flange 3 is connected by bolts 6 to the coupling flange 5 of a suitable vacuum pump by means of which a predetermined low pressure is obtained and maintained within the housing 1. The pressure during a welding operation is preferably maintained below $5 \times 10^{-3}$ millimeters of mercury. Numerous vacuum pump arrangements are commercially available which can reduce the pressure in a housing of 24" diameter from atmospheric to the operating value in a suitably short time. The particular vacuum pumping arrangement used forms no part of the present invention.

Opposite the location where the branch conduit 1b opens into the main conduit, there is provided a support 8 for a workpiece or workpieces to be welded. The support 8 is shown as being mounted on a shaft 9 which extends through a suitable seal 10 in the bottom of the housing 1, and which is driven by a motor 11 through gears 12 and 13. The workpiece support 8 and its supporting and driving mechanism is shown by way of example only. Various types of workpiece supports and driving mechanisms may be alternatively used within the scope of the invention. For example, it is desirable in most instances to provide a transverse mechanism whereby the workpiece support can be driven longitudinally of the main conduit 1a, so as to move the workpiece linearly past the branch conduit 1b.

Many suitable workpiece supporting arrangements are known and used on automatic welding machines, milling machines and the like.

A tubular member 14 is telescoped within the branch conduit 1b. An O-ring seal 14c is provided between the tubular member 14 and the branch conduit 1b. The tubular member 14 is provided at its upper end, as it appears in the drawing, with an outwardly projecting flange 14a, through which are threadedly inserted a plurality of bolts 15 whose lower ends abut the upper end of the branch conduit 1b. The bolts 15 are adjustable to move the tubular member in and out of the branch conduit 1b, so as to adjust its vertical position therein. The inner end of the tubular member 14 is partly closed by an annular plate 16 having its outer periphery welded to the tubular member 14. An annular mounting plate 17 is attached by bolts 18 to the annular plate 16 and supports at its center an electron gun generally indicated by the reference numeral 19. The mounting plate 17 is of non-magnetic material, e.g., brass. The tubular member 14 and the annular plate 16 may be steel. The non-magnetic plate 17 is provided with a central aperture 17a. An O-ring seal 17b is provided between the plates 16 and 17.

Figure 3:
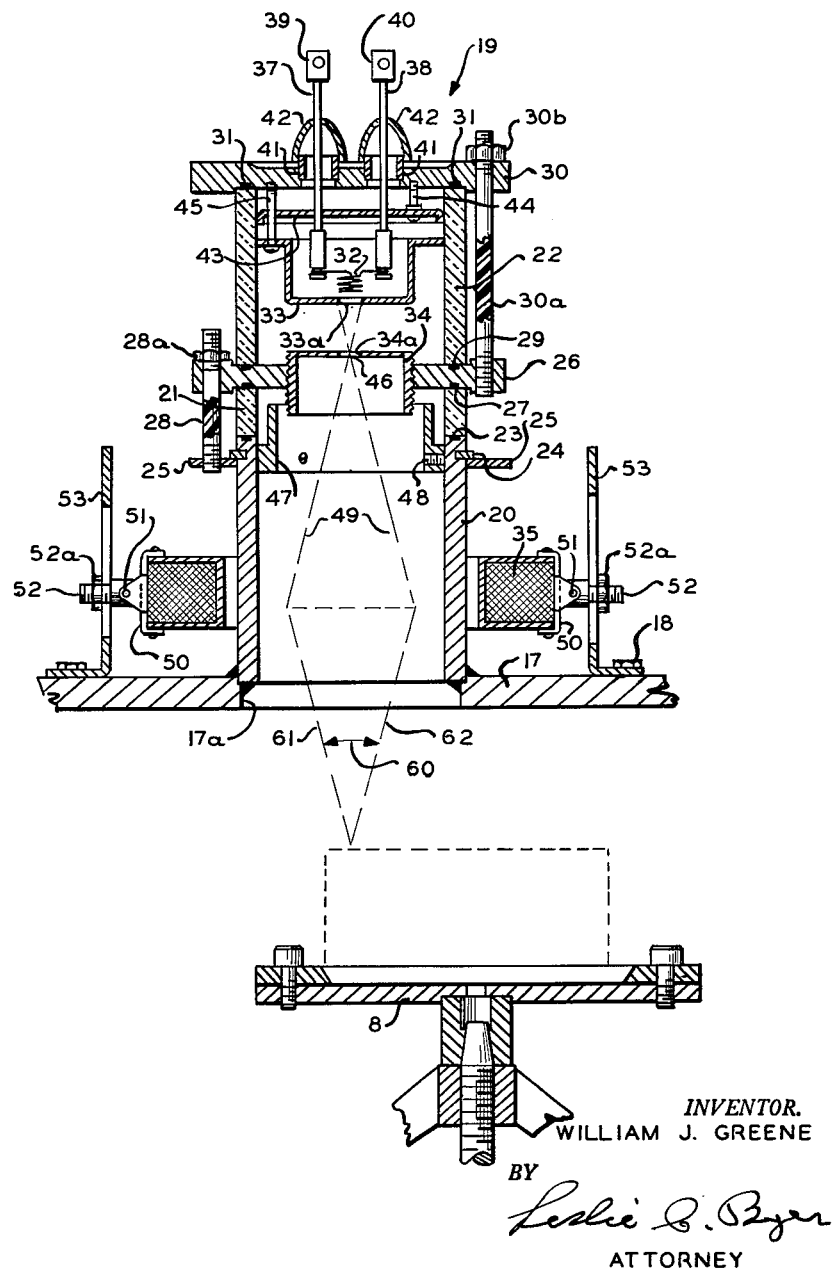
FIG. 3 is a fragmentary cross-sectional view, taken on the same line as FIG. 1, and showing the electron gun on an enlarged scale.

The electron gun 19, best seen in FIG. 3 comprises three stacked cylinders 20, 21 and 22. The cylinder 20 is of non-magnetic metal and is welded or brazed at its lower end to the plate 17 at the periphery of the aperture 17a. The cylinder 21 is of insulating material, e.g., glass, and rests on the top of the cylinder 20. An O-ring seal is provided between the cylinders 20 and 21 as shown at 23.

A split ring clamp 24 is received in a suitable recess on the outer surface of the cylinder 20 near the top thereof. A flat ring 25 abuts the under side of the split ring 24. A flat annular plate 26 rests on the top of the cylinder 21. An O-ring seal 27 is provided between plate 26 and cylinder 21. The plate 26 projects outwardly beyond the cylinders 21 and 22. Around the outer periphery of plate 26 there are provided a plurality of apertures for receiving bolts 28, of insulating material, e.g., nylon, which are threaded into ring 25. Nuts 28a cooperate with the bolts 28 to clamp the plate 26 and the ring 25 together and maintain the O-ring seals 27 and 23 under compression.

The upper cylinder 22 is also of insulating material, e.g., glass. An O-ring seal 29 is provided between cylinder 22 and plate 26. The upper end of cylinder 22 is closed by a brass plate 30. An O-ring seal 31 is provided between plate 30 and the upper end of cylinder 22. The periphery of the plate 30 projects outwardly beyond the cylinder 22. A plurality of bolts 30a of insulating material, e.g., nylon, extend through apertures in the plate 30 and are threaded into the plate 26. Nuts 30b cooperate with bolts 30a to hold the two plates 26 and 30 in alignment and to maintain the seals 29 and 31 under compression.

The cylinders 20, 21 and 22 and the plates 26 and 30 together provide the supporting and enclosing structure for the electrodes of the electron gun 19. Those electrodes include a cathode 32, a control electrode 33, and an accelerating anode 34. The gun also includes an electromagnetic focusing coil 35 mounted outside the cylinder 20 and provided with tilting mechanism illustrated in FIGS. 1 and 2, and described below.

Figure 5:
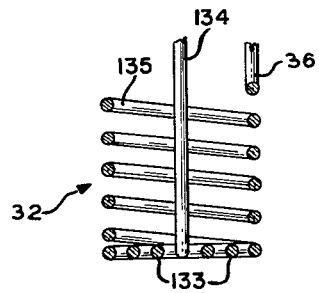
FIG. 5 is a cross-sectional view of the cathode structure.

The details of the cathode structure are shown in FIG. 5 and comprise a flat spiral 33 of tungsten wire integrally connected at its inner end to a vertically extending wire 34. The spiral 33 is also connected at its outer end to a helix 35, whose upper end is integrally attached to another vertically extending wire 36. The wires 33, 34, 35 and 36 are all of tungsten and comprise one integral cathode structure. The upper end of the wires 34 and 36 are bent over as shown in FIG. 3 and attached at their ends to electrically conductive rods 37 and 38 which extend through apertures provided in the plate 30 and are provided at their outer ends with terminals 39 and 40 adapted for connection to any suitable source of electric current. Bushings 41 are provided in the apertures of the plate through which the rods 37 and 38 pass, and insulating conical seals 42 connect the bushings 41 to the rods 37 and 38.

A heat shield plate 43 is mounted on the under side of plate 30 and spaced below it by means of bolts 44.

The control electrode or grid 33 is formed of stainless steel and is cylindrical, with its upper end open and its lower end substantially closed by a flat plate having an iris opening 33a at its center. The upper end of the grid 33 is provided with an external flange. Bolts 45 extend through the flange and support the grid 33 on the plate 30 and electrically connect it thereto. Suitable apertures are provided in the heat shield 43 for the passage of the rods 37 and 38 and the bolts 45. The aperture 33a is aligned with the cathode 32, and serves to focus the electrons emitted by the cathode 32 to a cross-over point indicated at 46.

The accelerating anode 34 is also of stainless steel and cylindrical and is provided on its external surface with a thread for insertion into a threaded opening in the plate 26 with which it is electrically connected. The lower end of anode 34 is open and its upper end is substantially closed by a horizontal plate provided with a central opening 34a which is horizontally aligned with the cross-over point 46.

A cylindrical metal shield or collar 47 is supported within the cylinder 20 by means of a plurality of set screws, one of which is shown at 48. The shield 47 protects the inside surface of the insulating cylinder 21 against the deposit of metallic vapors which otherwise might provide a short circuit path between the upper end of cylinder 20 across the surface of the cylinder 21 to the plate 26.

The beam of electrons produced by the cathode 32, after leaving the cross-over point 46, expands rapidly due to the high space charge of the beam. The contour of the beam is shown generally by the dotted lines 49 in the drawing. It may be seen that the beam reaches its maximum diameter at a locality substantially in horizontal alignment with the focusing coil 35. The coil 35 supplies a magnetic field which tends to narrow the beam and bring it to a sharp focus at the workpiece shown in dotted lines and mounted on the support 8.

Figure 2:
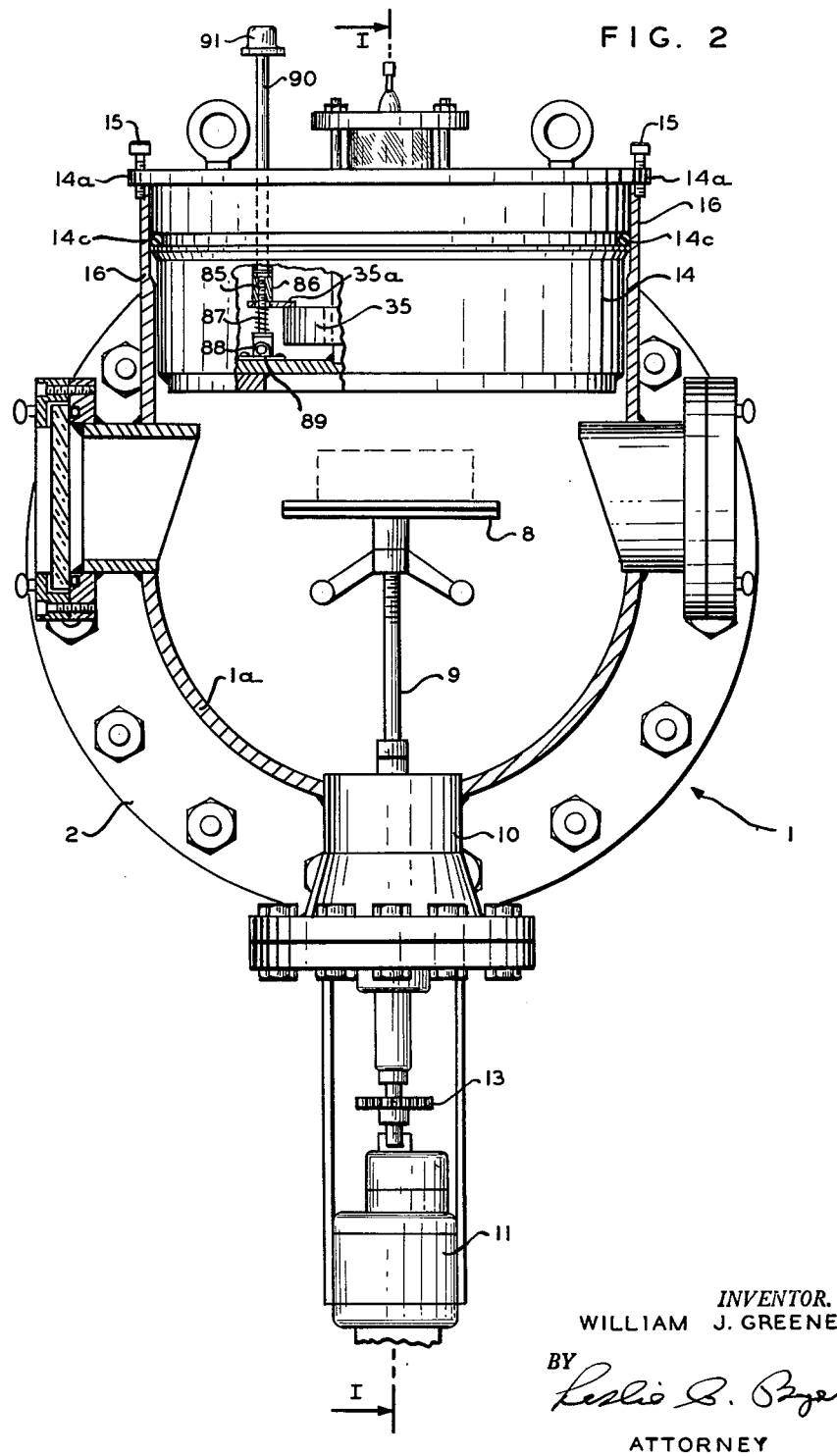
FIG. 2 is a sectional view taken on the line II—II of FIG. 1.

The coil 35 is mounted for vertical and tilting movement. Two yokes 50 are attached to the periphery of coil 35 at points 180° apart. Each yoke 50 carries a pair of ears apertured to receive a pivot 51 which passes through the head of a bolt 52 which extends through a vertical slot in a bracket 53 mounted at its lower end on the plate 17. A nut 52a is threaded on the bolt 52 and clamps the bracket 53 against the head of the bolt 52. Midway between the yokes 50 on the periphery of the coil 35 is welded a radially outwardly projecting plate 35a, which is apertured to receive a lead screw 85 as shown in FIG. 2. A sleeve nut 86 cooperates with the lead screw 85. The plate 35a is held against one end of the nut 86 by a coil spring 87, whose opposite end bears against the head of the screw 85. A pivot pin 88 extends through and supports the head of screw 85. The ends of the pivot pin 88 are supported by trunnions 89.

The upper end of sleeve nut 86 is coupled to a shaft 90 which extends upwardly and is provided on its upper end with an operating knob 91. The coil 35 may be raised and lowered by loosening the nuts 52a and sliding the bolts up and down in the slotted brackets 53, and making a corresponding adjustment in the height of plate 35a by operating the knob 91. The coil 35 may be tilted to shift the beam direction by suitable manipulations of the bolts 52 and the knob 91.

In order to provide high current (e.g., 1 ampere), it is necessary for electron beam welding with a cathode to workpiece potential of 15,000 volts or less, to use a beam of high current density. It has not previously been known how to focus such a high density beam to a small diameter welding spot. Such a beam has a high space charge, i.e., a mutual repulsion of the electrons of the beam, because of their own negative charges. Such a space charge tends to spread the beam and requires a strong focusing field (which may be electrostatic or electromagnetic) to focus it against the spreading tendency of the space charge. However, such a strong field is known to introduce defocusing tendencies of the types called chromatic aberration and spherical aberration by analogy to similar phenomena in optical lenses. It was thought that if the field were made strong enough to overcome the space charge, the defocusing effects of these aberrations would appear and prevent an effective focus. It has now been discovered, however, that there is a particular critical angle of convergence of the electron beam, which, for currents within a range of values which is highly useful in welding techniques, the focusing field may be made strong enough to overcome the space charge effects without introducing defocusing due to chromatic and spherical aberration.

The term "angle of convergence," as used in this specification, means the angle subtended by the maximum diameter of the electron beam, as it appears to an observer located at the workpiece. For example, the angle of convergence is illustrated in the drawing at 60, being the angle between the lines 61 and 62. It has been determined that the critical angle of convergence is in the neighborhood of 28°.

The angle of convergence may be measured by measuring the maximum beam diameter and the distance from that maximum diameter to the workpiece, and determining the angle from the value so determined for a trigonometric function of the angle. The beam diameter may be measured by supporting in the beam a sheet of metal, e.g., aluminum, coated with a suitable phosphor, e.g., cadmium phosphate or cadmium sulfate. The coated sheet may be marked with a scale, and may be observed through one of the lower glass cylinders of the electron gun.

For values of current at the upper end of the useful range, this angle is very critical. The use of a larger angle of convergence, which may be produced by a stronger focusing field, will tend to introduce chromatic and spherical aberrations and accompanying defocusing effects. The use of a smaller angle, which may be produced by a weaker focusing field, will allow the beam to spread because the focusing field is not strong enough to contain the space charge.

As the current in the beam is reduced from its value at the upper limit of the useful range, the angle of convergence becomes less critical, since the less dense electron beam has less of a tendency to defocus due to the space charge, and may be focused by a weaker focusing field, with a smaller angle of convergence.

For any value of current, however, the critical angle of convergence remains the optimum for freedom from both the defocusing effects due to space charge and those due to chromatic and spherical aberrations.

The housing and electron gun structure described above provide an electron beam welding apparatus which is constructed from readily available parts. For any given installation, the dimensions of the housing may be selected to suit the size of the workpieces to be welded. For any selected size of housing, the volume required to be evacuated is minimized. Furthermore, all parts of the electron gun are readily accessible for repair and replacement. For example, it may be desirable to use different sizes of cathodes for different beam current requirements.

FIG. 4

Figure 4:
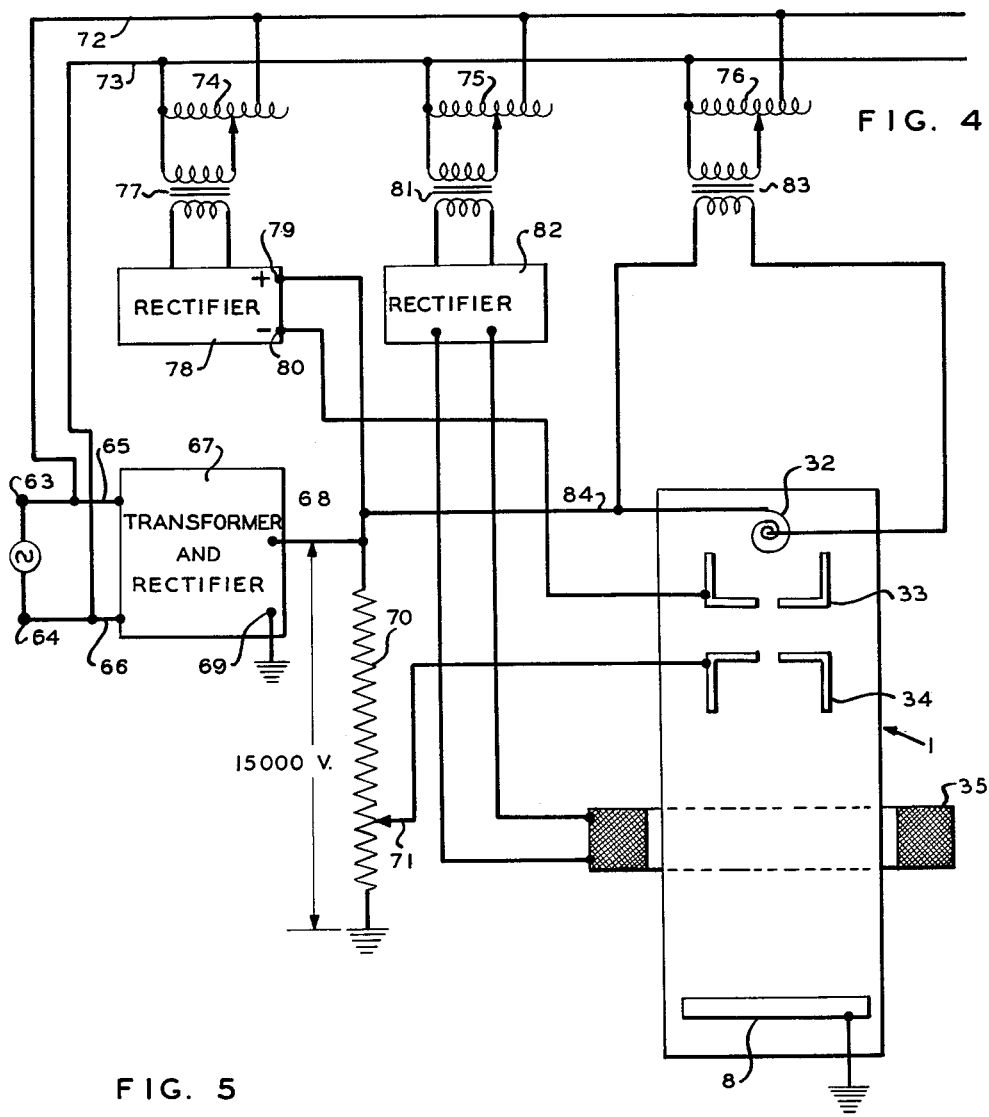
FIG. 4 is a wiring diagram showing a power and potential supply system for the apparatus of FIGS. 1–3.

This figure is a wiring diagram of electrical circuits for supplying current and potentials to the various electrodes and the focusing coil 35 of the electron beam welding apparatus shown in FIGS. 1 to 3 and 5. The principal parts of the electron beam welding apparatus of FIGS. 1 to 3 are shown diagrammaticaly in FIG. 4 and have been given the same reference numerals which were applied in the structural FIGURES 1 to 3.

Power is taken from input terminals 63 and 64 which may be connected to any suitable source of electrical energy. In the example illustrated, it is assumed that the source is an alternating current supply line.

Electrical power from the terminals 63 and 64 passes through wires 65 and 66 to a transformer and rectifier unit 67 having an output terminal 68 at 15,000 direct current volts above ground and an output terminal 69 which is grounded. The terminal 68 is connected to one terminal of an elongated slide wire resistor 70, whose opposite terminal is ground. This resistor may be a 30 megohm, 120 watt, 20 kv. rated resistor. A slider 71 is shown engaging the resistor 70 at about the 5,000 volt level, and is connected to the accelerating anode 34 through plate 26. Power supply lines 72 and 73 branch from the wires 65 and 66 and supply current to three autotransformers 74, 75 and 76. Autotransformer 74 supplies energy through a transformer 77 and a rectifier 78 to direct current terminals 79 and 80. Positive terminal 79 is connected to the high voltage terminal of the resistor 70 and to cathode 32. Negative terminal 80 is connected to the control electrode 33 through plate 30. By the use of a separate rectifier 78 and power supply transformers 74 and 77, the potential of control electrode 33 is maintained independent of any variation of the potential of the accelerating anode 34. The potential of control electrode 33 may be varied by changing the position of the movable tap on the autotransformer 74.

Autotransformer 75 supplies energy through a transformer 81 and a rectifier 82 direct current energy to the focusing coil 35. The current flow through the focusing coil may be varied by changing the movable tap on the autotransformer 75.

Autotransformer 76 supplies energy through a transformer 83 to the cathode 32. The transformer 83 supplies the heating current for the cathode. The potential of the cathode 32 with respect to ground is determined by a wire 84, which connects the cathode to the high potential terminal of the resistor 70. The current flow through the cathode 32, and hence the rate of emission of electrons therefrom, is controlled by the movable tap on the autotransformer 76.

As used in this specification, the term "workpiece" may refer either to two pieces of metal to be welded together, or to a single piece of metal to be subjected to a surface treatment, a cutting treatment, or other heat treatment which may be produced by an electron beam. Similarly, the term "welding" may refer to any such heat treatment.

I claim:

1. An electron gun comprising a cylinder of insulating material open at both ends, a first plate of electrically conductive material, means for holding said first plate across one end of said cylinder in sealing engagement therewith, a cathode electrode mounted on said first plate and within said cylinder, a control electrode mounted on said first plate and within said cylinder, means insulating said cathode electrode from said control electrode, means including said first plate for conducting electricity to one of said electrodes, a second plate of electrically conductive material, means for holding said second plate across the opposite end of said cylinder in sealing engagement therewith, an anode electrode supported on said second plate within said cylinder and in alignment with said other electrodes, means including said second plate for conducting electricity to said anode electrode, said first and second plate holding means including means outside said cylinder holding said plates in alignment and therefore maintaining alignment between said electrodes and comprising electrically non-conducting members engaging both said plates outside of said cylinder.

2. An electron gun as defined in claim 1, in which said holding means comprises a plurality of nylon bolts extending between said plates and threadedly engaging at least one of the plates.

3. An electron gun as defined in claim 1, including a second cylinder of insulating material, a cylindrical support for said second cylinder, and means holding said second plate in alignment with said support and maintaining sealing engagement between the respective ends of the second cylinder and the plate and support.

4. An electron gun as defined in claim 3, in which said last-named holding means comprises a plurality of nylon bolts.

5. An electron gun as defined in claim 3, in which said support is an electrically conductive cylinder, and said last-named holding means includes a split ring in a slot formed in the periphery of the conductive cylinder, and a annulus abutting said split ring on the side thereof farthest from the cylinder end.

6. An electron gun as defined in claim 3, including a cylindrical shield mounted within said support and located between the target of the electron beam and the second insulating cylinder, to prevent deposit of vaporous material on said second cylinder.

7. A cathode for an electron gun, comprising a flat spiral of tungsten wire extending from a central point to a peripheral point, a straight tungsten wire having one end integral with said spiral at the central point and extending therefrom along an axis perpendicular to the plane of the spiral, a helix of tungsten wire having one end integral with the spiral at the peripheral point and encircling said straight wire, and means supporting the opposite ends of the straight wire and the helix.

8. An electron gun, comprising a source of electrons, a cylinder of electrically conductive material open at one end, electrically conductive means closing the other end of the cylinder except for a central aperture for passage of an electron beam, said cylinder having an external thread on its outer surface, a supporting plate having an internally threaded aperture receiving the threaded cylinder, and fixed supporting means for the plate and the source of electrons, the threaded cylinder and apertured plate being relatively rotatable to vary the spacing between the electron source and the cylinder.

9. Electron beam welding apparatus, comprising cathode means for producing a high current electron beam directed along a beam axis and incapable of causing the emission of X-rays in hazardous amounts, electron lens means for converging the beam at a locality close to the cathode means and thereafter allowing the beam to diverge through a substantial distance along said axis under the influence of its own space charge, an evacuable housing enclosing said cathode means and lens means, means in said housing for supporting a workpiece to be welded in alignment with said cathode means and lens means, and focusing means for reconverging the beam with an angle of convergence of about 28° to a high intensity and small diameter adjacent said workpiece supporting means, whereby the cathode means and lens means are located at a substantial distance from the workpiece and are not subject to deposition of vapors or ions arising therefrom during welding.

10. Electron beam welding apparatus as defined in claim 9, wherein said focusing means includes an electromagnetic coil outside the housing, and means for shifting the coil along said beam axis.

11. Electron beam welding apparatus as defined in claim 10, including means for tilting the focusing coil to shift the location of the weld spot.

12. Electron beam welding apparatus as defined in claim 10, including first control means for controlling the cathode current, second control means for controlling the grid potential, third control means for controlling the accelerating anode potential, and fourth control means for controlling the focusing coil current, all of said four control means being independently operable.

13. The method of welding with an electron beam, comprising the steps of producing a beam of electrons from a cathode, converging the beam at a locality close to the cathode, passing the beam through an accelerating anode and allowing it to spread, and refocusing the spread beam with an angle of convergence of substantially 28° to a welding spot of small diameter at the workpiece to be welded.

14. The method of welding with an electron beam having a current value of the order of 1 ampere, comprising the steps of producing a beam of electrons from a cathode, converging the beam at a locality close to the cathode, accelerating the electrons forming said beam by passing said beam through an accelerating anode maintained at a positive potential of the order of 15,000 volts with respect to the cathode, allowing said beam to spread by space charge effect as it passes beyond said accelerating anode and refocusing the spread beam to cause the beam to focus at a point not greater than $\frac{1}{16}$ inch in diameter with a converging angle of substantially 28° and placing the workpiece to be welded at the focal point of said beam.

References Cited in the file of this patent

UNITED STATES PATENTS

| | | |
|---|---|---|
| 1,289,672 | Collidge | Dec. 31, 1918 |
| 2,128,581 | Gardner | Aug. 30, 1938 |
| 2,319,061 | Hillier | May 11, 1943 |
| 2,417,213 | Picard | Mar. 11, 1947 |
| 2,423,066 | Gibson | June 24, 1947 |
| 2,771,568 | Stiegerwald | Nov. 20, 1956 |
| 2,778,926 | Schneider | Jan. 22, 1957 |
| 2,932,720 | Stohr | Apr. 12, 1960 |

FOREIGN PATENTS

| | | |
|---|---|---|
| 1,141,535 | France | Mar. 18, 1957 |

UNITED STATES PATENT OFFICE
CERTIFICATE OF CORRECTION

Patent No. 3,049,608                                August 14, 1962

William John Greene

It is hereby certified that error appears in the above numbered patent requiring correction and that the said Letters Patent should read as corrected below.

Column 1, line 35, for "conitions" read -- conditions --; column 2, line 63, for "inhibit" read -- inhibits --; column 4, line 20, for "lb" read -- lb. --; column 5, line 7, for "33" read -- 133 --; line 9, for "34" read -- 134 --; same line 9, for "33" read -- 133 --; line 10, for "35" read -- 135 --; line 11, for "33, 34" read -- 133, 134 --; line 12, for "35" read -- 135 --.

Signed and sealed this 21st day of July 1964.

(SEAL)

Attest:

ESTON G. JOHNSON                                EDWARD J. BRENNER
Attesting Officer                                  Commissioner of Patents